April 3, 1951     H. R. HARDING     2,547,318

TUBE AND PIPE FITTING

Filed Nov. 15, 1948

Inventor

HIRAM R. HARDING.

By Howard J. Whelan.

Attorney

Patented Apr. 3, 1951

2,547,318

UNITED STATES PATENT OFFICE 2,547,318

TUBE AND PIPE FITTING

Hiram R. Harding, Baltimore, Md., assignor of fifty per cent to Harry E. Karr, Baltimore County, Md., and twenty-five per cent to Logan C. Harding, Hopewell, Va.

Application November 15, 1948, Serial No. 60,018

2 Claims. (Cl. 285—123)

This invention relates to pipe fittings and couplings and more particularly to those that have compressible parts that vary in size to suit the piping to be coupled together, according to the amount of tightening or screwing done or required.

In the conventional form of coupling or union used in joining piping or tubing, that is smooth and unthreaded, a nut is employed to engage with a threaded shank, and in being screwed up brings a holed tapered portion into a tapered recess that wedges tightly into place. However since the hole in the tapered portion is made a little larger than the piping on which the fitting operates, the matter of preventing leakage is an uncertain item. To prevent such leakage, a soft resilient gasket of some kind, such as rubber or fibre is added. This is compressed by a shoulder on the nut until it spreads out the gasket and fills in around the cracks that allow the leakage and therefore stops them up. The requirement of a rubber or composition gasket in such fittings limits its use and also adds an element of deterioration that is objectionable. In this invention, the use of a metallic washer or gland is employed in an unusual manner that makes it a part of the fitting and clamps the piping effectively without the use of a gasket.

It is therefore an object of this invention to provide a new and improved fitting for piping that will avoid one or more of the disadvantages and limitations of the prior art.

Another object of the present invention is to provide a new and improved fitting for piping and tubing which uses metallic packing to prevent leakage of said fitting.

Another object of this invention is to provide a new and improved fitting for piping that can be easily applied and operated and which can be economically manufactured and placed on and removed from the tubing many times without serious damage.

A further object of this invention is to provide a new and improved fitting for piping that will be relatively simple in structure but effective in use. An additional object of this invention is to provide a new and improved pipe fitting that will include a stuffing box and gland in its structure adapted to cooperatively function together.

Other objects will become apparent as the invention is more fully set forth.

For a clearer comprehension of the invention, its objects and the principles thereof reference is made to the accompanying drawings which in connection with the following description outline a particular form of the invention. This is done by way of example to illustrate a structure that illustrates the invention adequately and its method of operation without limiting it in any way that will be less than the scope of the appended claims.

Referring to the drawings.

Similar reference characters refer to similar parts throughout the drawings.

Figure 4:
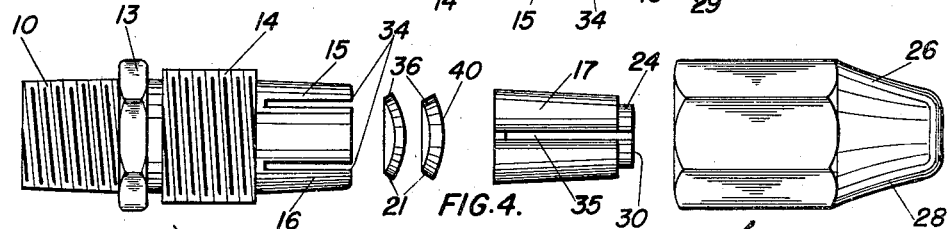
Figure 4 is a blown up view showing the parts comprising the tube and pipe fitting shown in Fig. 1.
Figure 3:
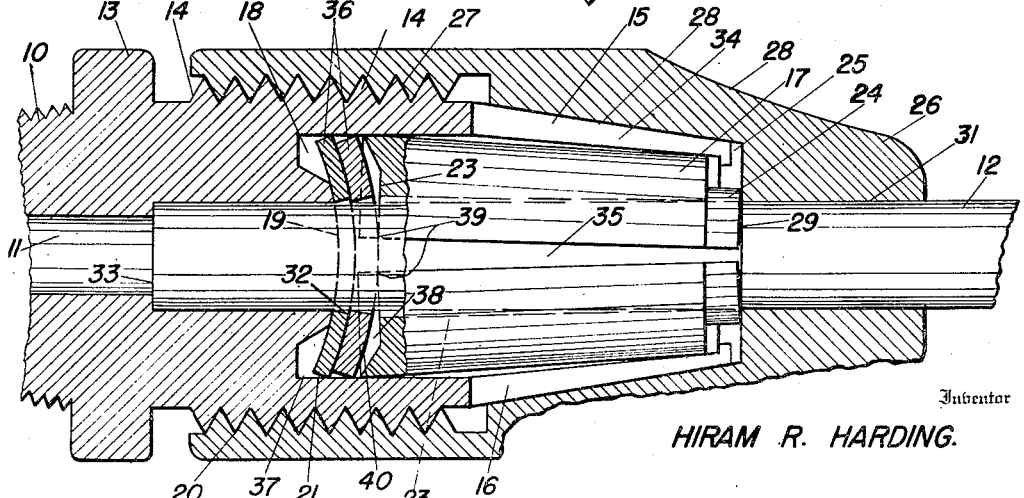
Figure 3 is an enlarged view similar to Fig. 2 showing the bent washers or glands tightly positioned on the pipe and in the chamber to prevent leakage therethrough.

In the particular structure shown in the drawings, a shell of a pipe coupling consists of an externally screw threaded end portion 10 having a central passage 11 included therein. This passage 11 is of a size designed to conform with the internal diameter of a piece of piping or tubing 12 passing through the shank. A hexagonally enlarged external tool portion 13 peripherally arranged on the shell serves as a means for the placing of a wrench thereon to turn it. The remaining portion of the shank is screw threaded peripherally in part at 14, from which extends a tapered nose 15 slotted through transversely at 34 to provide four separated longitudinally projecting prongs 16. This portion of the shell is centrally formed into a chamber 18 with the prongs 16 adapted to encompass a cylindrically formed and slightly tapered plug 17 having slits in its sides as indicated in Figure 4. A convexedly tapered seat 19 is formed on the inner face 20 of the shell and is used for engagement with bent washers or glands 21 of rigid material to spread them out radially. A passage 32 in the plug is large enough to permit the piping 12 to enter and be closely encompassed thereby. The length of the plug 17 is such as to be less than the length of the chamber 18 in order to permit the placement of the washers or glands 21 between its face 23 and the seat 19. The front end portion 24 of the plug is reduced in diameter to form a shoulder 25 in back of it against which the nut member 26 may contact to hold the plug in after insertion and for operation.

The nut member 26 is externally made into hexagon contour to facilitate its rotation by a wrench. Internally it is screw threaded at 27 to thread on to the peripheral threads 14 of the shell. The front portion of the member 26 internally tapers at 28 from the internal screw threads 27 to engage in wedge-like action on the peripheral surfaces of the prongs 16, and force them together as the member is screwed on. The tapering 28 terminates at a shoulder 29 in the member and serves as a buffer for engagement with the front face 30 of the plug 17. This shoulder portion is of solid form in both sections, which have a composite passage 31 longitudinally therethrough and of a size to receive the piping 12.

Figure 1:
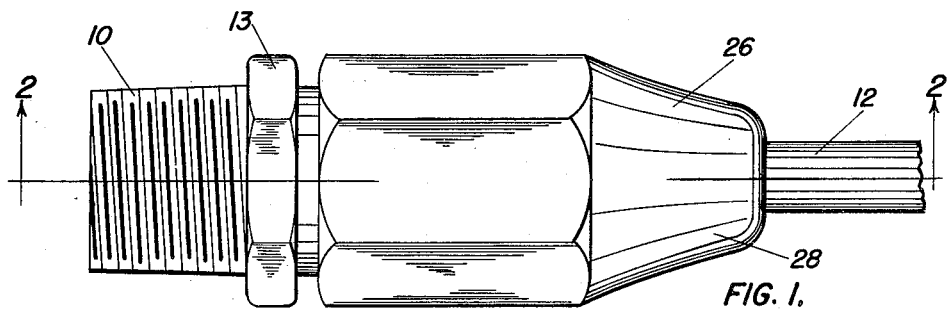
Figure 1 is a side elevation of a tube and pipe fitting embodying this invention.
Figure 2:
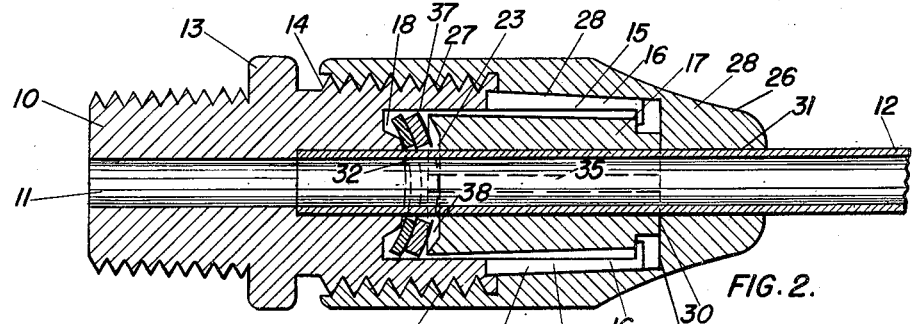
Figure 2 is a sectional view taken along line 2—2 of Fig. 1, showing the bent washers or glands loosely positioned on the pipe before they are pulled up to nearly a straight position to tightly grip the pipe and the inner surface of the chamber.

When the piping 12 is in position in the fitting, as shown in Figure 2, the nut member 26 is screwed on to the shell. The shoulder 29 presses against the front face 30 of the plug 17 forcing it inwardly and outwardly against the bent washers or glands 21 and moves them forward on the tubing until they contact the seat 19 and partially straightens them out so as to decrease the size of the hole in the washers so they will clamp tightly against the outer wall of the piping 12, by the reduction of their holes 32 as the washers are partially flattened out. Likewise their peripheral edges 36 press against the interior surface 37 of the chamber 18 and make a tight connection at that surface. In addition the tightening of the nut member 26 on the shell brings the tapered portion 28 against the prongs 16 and presses them inwardly as shown in Fig. 4. The prongs 16 therefore in turn, press tightly against the plug 17 within their encompassment and hold it in place on the piping. As the prongs 16 are depressed against the plug 17, the slot 35 at the front end is depressed or made smaller, while the rear end of plug through its tapered faces allows the slot 35 at that part to spread apart and allows the countersink 38 to be enlarged in diameter so only the edge portions of face 39 contact the convexed face 40 of the washer 21 and presses against same.

In the manufacture of the washers or glands, the diameter of the hole 32 is made of a close fitting size to suit the piping 12 to be passed through it, when the washer is in its normal bent form. When the washer is pressed against to flatten it, the hole 32 is formed to a smaller diameter, as the change in form takes place. At the same time the outside diameter becomes larger. Thus the washer tends to clamp tightly on the piping placed within the hole, as the washer flattens under pressure, while the peripheral edge presses outwardly into the wall surface 37 of the chamber. The seat 19, by its convex or angular form facilitates the action on the washer or glands by controlling the amount of flattening taking place. This is important since too much flattening produces a "dead-center action" and tightens it so immovably that it is liable to prevent the removal of the washers or glands, when the fitting is disassembled. The seat 19 also prevents the washer being forced beyond its elastic limit during the flattening process. The piping when placed in the fitting is butted up against a shoulder 33 formed at the end of the passage, in the shell 10 instead of being free and open as in the usual type of union.

This type of fitting requires no flaring of the tubing and the use of string or wound up packing. This is important, since such flaring is subject to leakage and requires special tools for its formation. Further the piping is squeezed both inside and outside so that its wall is compressed severely, in the conventional union. This the invention avoids, as the washers or glands 21 are the compressed items that make the joint tight, and no particular attention or skill is required for the provision of a gasket. The glands 21, in conjunction with the tightening action of the nut member 26 operate on the principle of a stuffing box.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. The combination of a pair of coupling members arranged for engagement with each other, one of said members having stepped internal bores and an outer threaded portion and an integral, tapered, slotted extension adjacent to said threaded portion, a smooth tubing received in one of said internal bores and abutting a shoulder therein, a plurality of bent washers received in another of said bores and abutting a shoulder therein, said washers straddling said tubing, a hollow tapered plug about said tubing abutting said washers, said plug being longitudinally slotted, the other of said coupling members having internal threads to engage the threaded portion of said first coupling member and having a sleeve portion slidably engaging said tubing and an internal abutment engaging said tapered plug, whereby screwing of the second member upon the first member forces said plug against said washers and causes the latter to straighten and firmly grip said tubing.

2. The combination set forth in claim 1, each of said coupling members having external hexagonal portions engageable by a wrench.

HIRAM R. HARDING.

REFERENCES CITED

The following references are of record in the file of this patent:

UNITED STATES PATENTS

| Number | Name | Date |
| --- | --- | --- |
| 208,965 | Crowell | Oct. 15, 1878 |
| 1,725,975 | Bystricky | Aug. 27, 1929 |
| 2,341,164 | Shimek | Feb. 8, 1944 |
| 2,450,170 | Smith | Sept. 28, 1948 |
| 2,453,024 | Lomelino | Nov. 2, 1948 |
| 2,490,620 | Cole et al. | Dec. 6, 1949 |